United States Patent [19]

Auracher

[11] 4,056,377
[45] Nov. 1, 1977

[54] METHOD FOR THE PRODUCTION OF ONE-MATERIAL OPTICAL FIBERS

[75] Inventor: Franz Auracher, Munich, Germany

[73] Assignee: Siemens Aktiengesellschaft, Berlin & Munich, Germany

[21] Appl. No.: 676,351

[22] Filed: Apr. 12, 1976

[30] Foreign Application Priority Data

Apr. 15, 1975 Germany .............................. 2516375

[51] Int. Cl.² ...................... C03C 23/20; C03B 11/08
[52] U.S. Cl. ......................................... 65/4 A; 65/36; 65/38; 65/77; 65/108; 29/527.1
[58] Field of Search ................... 65/DIG. 7, 38, 4 A, 65/36, 77, 108; 29/527.1

[56] References Cited

U.S. PATENT DOCUMENTS

| 3,455,667 | 7/1969 | Snitzer et al. | 65/38 X |
| 3,712,705 | 1/1973 | Marcatilli | 65/DIG. 7 |
| 3,805,735 | 4/1974 | Reuschel | 65/DIG. 7 |
| 3,813,141 | 5/1974 | Miller | 65/DIG. 7 |
| 3,901,674 | 8/1975 | Strack et al. | 65/DIG. 7 |
| 3,950,073 | 4/1976 | Horiguchi et al. | 65/DIG. 7 |

Primary Examiner—S. Leon Bashore
Assistant Examiner—Frank W. Miga
Attorney, Agent, or Firm—Hill, Gross, Simpson, Van Santen, Steadman, Chiara & Simpson

[57] ABSTRACT

A method for producing one-material optical fibers having at least one light conducting component supported in a protective sleeve or casing characterized by forming a one-piece blank having an open cross section by either pressing, continuous casting, chill casting or rolling, working the blank to close the cross section, heating the blank with the closed cross section to a suitable temperature for drawing and drawing the blank with the closed cross section into the one-material optical fiber having a closed cross section. Preferably, the protective casing during the step of forming is formed in two casing components having edges extending along the length of the blank and spaced apart and the step of working the blank forces the edges into engagement with each other to form a closed cross section.

9 Claims, 5 Drawing Figures

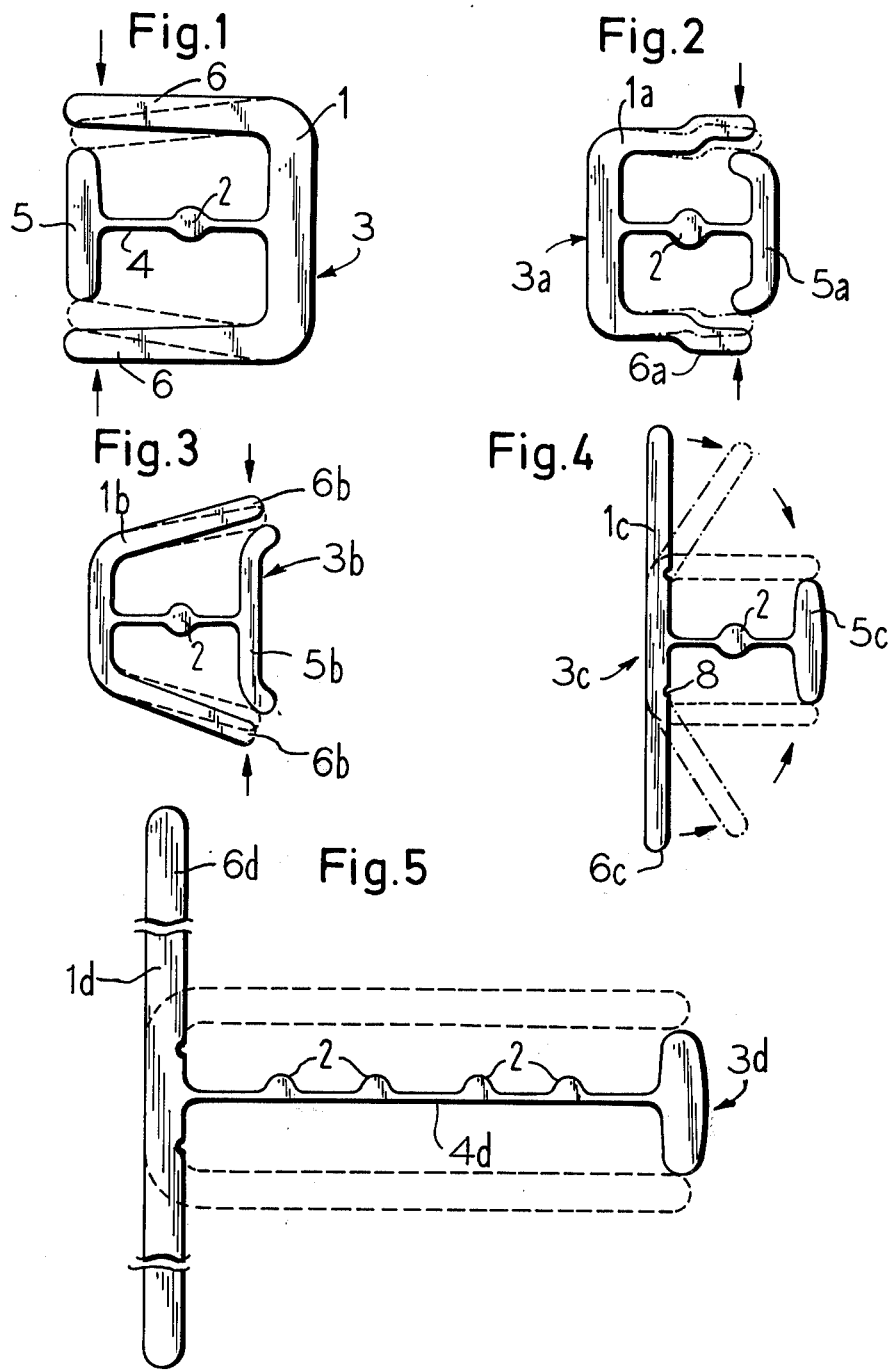

METHOD FOR THE PRODUCTION OF ONE-MATERIAL OPTICAL FIBERS

BACKGROUND OF THE INVENTION

1. Field of the Invention

The present invention relates to a method for producing one-material optical fibers which consist of at least one light conducting core component supported by at least one support component within a protective casing or shell.

2. Prior Art

A particularly suitable light conducting fiber having a low attenuation is a single-material or one-material optical fiber, which is also known as dielectric rib waveguide or slab coupled waveguide. The one-material fiber consists of quartz which can be produced in a pure form and thus has a low optical attenuation.

One-material optical fibers are known which consist of a thin quartz carrier having a thickness of a few $\mu$m and possess a rib-like enlargement which serves to conduct the light. In order to impart mechanical stability to this extremely fragile structure and to protect the surface of the conducting element from pollution, the structure is usually supported in a thicker quartz tube.

In the production of one-material optical fibers with a closed cross section, a blank having a similar shape but of a considerably larger cross section is produced. Since blanks with a closed cross section are difficult to manufacture, they are currently being assembled from a plurality of individual components, for example an outer tube, a thin supporting plate and a rod. After assembling the blanks, they are subsequently heated and drawn to form the optical fibers. One-material optical fibers of the above described type are discussed in an article by P. Kaiser and H. W. Astle, "Low-Loss Single-Material Fibers Made From Pure Fused Silica", *The Bell Systems Technical Journal*, Vol. 53, No. 6, July–August 1974, pp. 1021–1039.

SUMMARY OF THE INVENTION

The present invention is directed to a method for producing one-material optical fibers having at least one conductor component supported in a protective sleeve or casting, which method is considerably simplified and thus less expensive.

For the realization of this task, the method comprises the steps of forming a one-piece blank having an open cross section, working the blank to close the cross section, heating the blank with the closed cross section to a suitable temperature for drawing and subsequently drawing the blank with the closed cross section into a one-material optical fiber having a closed cross section. The step of forming the blank can be by pressing, rolling, or by casting the blank with an open cross section either by a continuous casting process or a chill casting process. The step of working the blank to close the cross section can be by rolling, pressing or drawing the blank through a die.

The step of forming the blank comprises providing a one-piece blank having at least one light conducting component integrally formed with a thin supporting component that extends between a pair of casing components whose side edges are spaced apart. During the step of working the blank, the side edges of the casing components are forced into engagement with each other. In some embodiments of the method, depending on the cross-sectional configuration of the blank, a portion of at least one of the components is folded as the side edges are being forced into engagement.

BRIEF DESCRIPTION OF THE DRAWINGS

FIGS. 1–4 are end views of four different blanks having an open cross section in accordance with the present invention with the closed cross section of the configuration being illustrated in broken lines; and FIG. 5 is an end view of a blank having an open cross section which blank is formed in accordance with the present invention and used to produce a light conducting cable.

DESCRIPTION OF THE PREFERRED EMBODIMENTS

The principles of the present invention are particularly useful in a method of forming a one-material or single-material optical fiber which has a light transmitting component supported in the interior of a protective casing or shell having a closed cross section by a supporting web or component.

The method of forming the optical fiber comprises the steps of forming a one-piece blank 3 having at least one light conducting core component 2 integral with a support web 4 which extends between casing components 1 and 5. After forming the one-piece blank, the side edges of the casing components 1 and 5 are forced into engagement to close the cross section of the blank as illustrated in broken lines in each of the figures. Subsequent to working the blank to close the cross section, the blank is heated to a suitable drawing temperature which is just below the melting temperature of the material being employed and then drawn into the one-material optical fiber.

The step of forming the one-piece blank having the opening cross section can be accomplished by rolling, continuous casting, chill casting or pressing such as occurs in an extrusion process. The particular cross-sectional configuration may assume various shapes depending on the initial steps for forming the initial blank. For example if the one-piece blank is formed by a continuous casting process, one of the casing components 1 can have a substantially U-shaped cross section with legs 6,6 which are slightly spaced from the side edges of the casing component 5. In FIG. 2, a blank 3a has a different configuration with casing component 1a with legs 6a provided with an offset and a casing component 5a having inturned edge portions. In FIG. 3, a blank 3b has casing component 1b with diverging legs 6b and a casing component 5b with outturned edge portions. During the step of working the one-piece blank 3, 3a, or 3b, pressure is applied laterally to the legs 6, 6a or 6b in a direction which is illustrated by the arrows in FIGS. 1, 2 or 3, to force the edges of the legs into engagement with edges of the respective casing component 5, 5a or 5b.

If the step of forming the blank having an open cross section is accomplished by rolling or pressing, the open cross section may take a configuration such as illustrated by blank 3c of FIG. 4 or blank 3d of FIG. 5. In FIG. 4, the casing component 1c with legs 6c has a substantially planar configuration so that during the subsequent working step, the legs 6c are folded along the length of the blank as illustrated. This folding can be a progressive folding such as illustrated in FIG. 4 and to facilitate the folding, the blank may include longitudinally extending fold notches or grooves 8.

The blank 1d, which is illustrated in FIG. 5, is similar to the blank 1c except that the intermediate web 4d supports a plurality of light conducting components 2 so that a light conducting cable having a plurality of light conducting components or ribs 2 is formed by the subsequent drawing of the blank with a closed cross section into an optical element.

A practical example of forming the one-material optical fiber is as follows.

A body of quartz glass ($SiO_2$) is heated to a temperature of about 1700° C and pressed through a profile nozzle of graphite to extrude a glass blank with a profile or configuration of the blank 3c (FIG. 4). This one-piece blank 3c has a maximum cross-sectional dimension of about 10 mm, and from a single glass batch, a blank of this type will be produced with a length of about 250 mm. In a working step, the two exterior portions or legs 6c of the casing component 1c are bent or folded at approximately 90° so that their edge portions are in engagement with the edge portions of the portion 5c. The bending or folding is accomplished by pressing graphite rollers which fold the portions 6c of the component 1c as illustrated in broken lines in FIG. 1 with the direction of pressure being indicated by the arrows. During the forming of the one-piece blank having the open cross section and then being worked to close the cross section, the process is conducted preferably in an atmosphere of protective gas such as argon.

After cooling, the one-piece blank having the closed configuration is heated by an oxyhydrogen burner to a temperature of about 1800° C and drawn into a fiber having a diameter of about 200 μm. This fiber will be a one-material light guiding or optical fiber.

Although various minor modifications may be suggested by those versed in the art, it should be understood that I wish to employ within the scope of the patent warranted hereon, all such modifications as reasonably and properly come within the scope of my contribution to the art.

I claim;

1. A method for the production of one-material optical fibers having at least one light conducting core component supported by a support component in a surrounding protective casing, said method comprising the steps of forming a one-piece blank having at least one light conducting core component integrally formed with a thin supporting component that extends between a pair of casing components whose side edges are spaced apart to provide an open cross section for the blank, working the blank to force the side edges of at least one of the casing components into engagement with the side edges of the other casing component to close the cross section and to form a blank with a closed cross section, heating the blank with the closed cross section to a suitable temperature for drawing, and drawing the blank with the closed cross section into said one-material optical fiber.

2. A method according to claim 1, wherein the step of forming comprises pressing the material into a blank having an open cross section.

3. A method according to claim 1, wherein the step of forming the blank having an open cross section comprises casting.

4. A method according to claim 1, wherein the step of forming the blank with an open cross section comprises rolling.

5. A method according to claim 1, wherein the step of working the blank comprises rolling.

6. A method according to claim 1, wherein the step of working the blank comprises drawing the blank through a die.

7. A method according to claim 1, wherein the step of working comprises pressing.

8. A method according to claim 1, wherein the step of working further includes folding at least one of the casing components as the side edges of the components are being forced into engagement with each other.

9. A method according to claim 1, wherein the step of forming the one-piece blank comprises extruding a body of quartz glass into the one-piece blank, and wherein said step of working the blank to force the edges into engagement comprises rolling.

* * * * *